(12) United States Patent
Song et al.

(10) Patent No.: US 8,568,131 B2
(45) Date of Patent: Oct. 29, 2013

(54) HORIZONTAL MOLDING METHOD AND APPARATUS OF INTERIOR MATERIAL OF VEHICLE

(75) Inventors: In Ho Song, Asan-si (KR); Ji Hyun Cho, Asan-si (KR)

(73) Assignee: Han Il E Hwa Co., Ltd., Seoul (KR)

( * ) Notice: Subject to any disclaimer, the term of this patent is extended or adjusted under 35 U.S.C. 154(b) by 219 days.

(21) Appl. No.: 12/994,888

(22) PCT Filed: May 18, 2010

(86) PCT No.: PCT/KR2010/003121
§ 371 (c)(1),
(2), (4) Date: Nov. 29, 2010

(87) PCT Pub. No.: WO2011/136428
PCT Pub. Date: Nov. 3, 2011

(65) Prior Publication Data
US 2011/0266721 A1  Nov. 3, 2011

(51) Int. Cl.
*B29C 45/14* (2006.01)
*B28B 21/36* (2006.01)

(52) U.S. Cl.
USPC .......................................... 425/504

(58) Field of Classification Search
USPC .......................................... 425/504
See application file for complete search history.

(56) References Cited

U.S. PATENT DOCUMENTS 6,012,765 A * 1/2000 Novoa et al. ............. 296/190.08
2008/0284053 A1* 11/2008 Dutouquet .................... 264/102

* cited by examiner

*Primary Examiner* — Robert J Grun
(74) *Attorney, Agent, or Firm* — LRK Patent Law Firm (57) ABSTRACT

Horizontal molding method and apparatus of an interior material of a vehicle are provided. The horizontal molding apparatus includes a preheating means for preheating a skin material; a transfer unit including fixing units for vertically attaching or detaching the preheated skin material on or from the transfer unit; a first mold disposed perpendicularly to a ground surface and including suction units for vacuum-sucking and fixing edges of the skin material, a base member having an embossed pattern printed on the skin material, fixing members for sealing an internal space between the skin material and the base member, and vacuum holes for vacuum-sucking the skin material onto the base member; a second mold disposed in parallel with the first mold and on which a base material is injected; and a mold moving means for horizontally moving the first or second mold and combining or separating the first and second molds to or from each other.

16 Claims, 7 Drawing Sheets

HORIZONTAL MOLDING METHOD AND APPARATUS OF INTERIOR MATERIAL OF VEHICLE

CROSS REFERENCE TO RELATED APPLICATION

This application is a National Stage of International Application No. PCT/KR2010/003121 filed May 18, 2010, claiming priority based on Korean Patent Application No. 10-2010-0040499 filed Apr. 30, 2010, the content of which is incorporated herein by reference in its entirety.

TECHNICAL FIELD

The present invention relates to a horizontal molding method and apparatus of an interior material of a vehicle, and more particularly, to a horizontal molding method and apparatus of an interior material of a vehicle, capable of integrally molding an injected base material and a skin material by using a pair of horizontally moving left and right molds, preventing sagging of the skin material that is vertically clamped onto one of the molds, and performing the molding process regardless of the thickness of the skin material.

BACKGROUND ART

General interior materials of a vehicle include a door trim, a filler, a trunk mat, a package trim, a headliner, etc. Interior materials of some vehicles are formed to improve their appearances or textures by attaching a soft skin material having an embossed pattern onto a hard base material. That is, some vehicles use interior materials formed by injection-molding only a hard base material while some other vehicles, e.g., high-level vehicles, use interior materials formed by attaching a soft skin material such as fabric onto a hard base material.

For example, polypropylene (PP), PP felt, PP board, acrylonitrile butadiene styrene (ABS), wood stock, or resin felt is commonly used as a hard base material, and felt, fabric, polyvinyl chloride (PVC), or thermoplastic polyolefin (TPO) on which polyethylene (PE) foam, PP form, or polyurethane (PU) foam is bonded is commonly used as a soft skin material to be attached on the base material.

In a typical molding method of an interior material of a vehicle, a skin material having an embossed pattern is inserted into a mold and then a base material (thermoplastic resin such as PP) is injection-molded on a rear surface of the skin material. However, the skin material may be expanded in the mold or the embossed pattern of the skin material may be damaged due to high injection temperature and pressure to cause deterioration in appearance. In order to prevent these problems, Korean Patent Publication No. 10-2008-0033598 discloses a technology of forming an upper mold as a vacuum mold, preheating and then vacuum-sucking fabric onto a bottom surface of the upper mold, and thus preventing damage of the fabric when upper and lower molds are combined, and a technology of previously forming an embossed pattern on the bottom surface of the upper mold, printing the embossed pattern on the fabric in a molding process, and thus improving the appearance of the fabric without damaging the embossed pattern.

However, the above technologies may be easily used in a vertical molding apparatus for vertically moving a skin material and an injected base material, but may not be easily used in a horizontal molding apparatus for horizontally moving a skin material and an injected base material.

In general, an upper mold has to be a vacuum mold for vacuum-sucking fabric and a space between the fabric and a bottom surface of the upper mold has to be sealed to prevent air leakage. As such, basically, the fabric has not to be air permeable and thus is generally formed in a double structure including a skin layer formed of TPO or PVC having a thickness of 0.5 to 1 mm and excellent elongation, and a PP foam layer having a thickness of 2 to 3 mm and excellent thermal resistance, or in a single structure including only a skin layer.

In order to appropriately perform vacuum-suction, fabric is preheated to a temperature equal to or greater than 300° C. before being inserted into a mold. If the preheated fabric is inserted into the mold, the fabric is not flat but is expanded to sag downward. In a typical vertical molding apparatus, fabric that sags downward is horizontally inserted into a mold and thus no problem occurs in a molding process.

However, in a horizontal molding apparatus, since fabric that is preheated and expanded is vertically inserted, the fabric may sag downward due to its weight and thus may be folded. In particular, if the fabric includes only a skin layer to have a small thickness, the fabric may be folded more seriously.

Furthermore, although fabric has to be preheated and then be inserted into a mold as soon as possible, unlike a vertical molding apparatus that may manually insert the fabric, a horizontal molding apparatus has to automatically insert the fabric and thus requires more time in comparison to the vertical molding apparatus.

Due to the above-described problems, only vertical molding apparatuses are developed and horizontal molding apparatuses hardly exist to form an interior material of a vehicle by integrally molding a skin material and a base material.

DISCLOSURE OF INVENTION

Technical Problem

The present invention provides a horizontal molding method and apparatus of an interior material of a vehicle, capable of integrally molding a skin material and a base material by using horizontally moving molds.

The present invention also provides a horizontal molding method and apparatus of an interior material of a vehicle, capable of preventing a skin material expanded in a preheating or heating process from sagging downward due to its weight, and completely sealing the skin material so as not to be folded or wrinkled.

Technical Solution

According to an aspect of the present invention, there is provided a horizontal molding apparatus of an interior material of a vehicle, the horizontal molding apparatus including a preheating means for preheating a skin material; a transfer unit formed to be movable and comprising fixing units for vertically attaching or detaching the preheated skin material on or from the transfer unit; a first mold disposed perpendicularly to a ground surface and comprising suction units for vacuum-sucking and fixing edges of the skin material transferred by the transfer unit, a base member having an embossed pattern to be printed on the skin material, fixing members for sealing an internal space between the skin material and the base member by clamping the edges of the skin material, and vacuum holes for vacuum-sucking the skin material onto the base member; a second mold disposed in parallel with the first mold and on which a base material is injected; and a mold moving means for horizontally moving one of the first and second molds and combining or separating the first and second molds to or from each other.

According to another aspect of the present invention, there is provided a horizontal molding apparatus of an interior material of a vehicle, the horizontal molding apparatus including a transfer unit formed to be movable and comprising fixing units for vertically attaching or detaching a skin material on or from the transfer unit, and a heating unit for heating the skin material; a first mold disposed perpendicularly to a ground surface and comprising suction units for vacuum-sucking and fixing edges of the skin material transferred by the transfer unit, a base member having an embossed pattern to be printed on the skin material, fixing members for sealing an internal space between the skin material and the base member by clamping the edges of the skin material, and vacuum holes for vacuum-sucking the skin material onto the base member; a second mold disposed in parallel with the first mold and on which a base material is injected; and a mold moving means for horizontally moving one of the first and second molds and combining or separating the first and second molds to or from each other.

The fixing units of the transfer unit may attach or detach the skin material by vacuum-sucking the edges of the skin material.

The fixing members may include clamps for supporting the edges of the skin material; vertical cylinders for vertically moving the clamps; and horizontal cylinders for horizontally moving the vertical cylinders.

The horizontal molding apparatus may further include support pins protruding from the clamps and for supporting the edges of the skin material; and pinholes formed in the first mold and into which the support pins are inserted.

The horizontal molding apparatus may further include support pins protruding from the first mold and for supporting the edges of the skin material; and pinholes formed in the clamps and into which the support pins are inserted.

Each of the vacuum holes may be formed in a double structure comprising a large diameter hole penetrating through the base member, and a small diameter hole extended from the large diameter hole and connected to the internal space between the skin material and the base member.

The horizontal molding apparatus may further include an air nozzle for injecting air into the internal space between the skin material and the base member in order to expand the skin material; and an ionizing member for ionizing air to be injected through an air nozzle into the internal space between the skin material and the base member.

The horizontal molding apparatus may further include a temperature sensor for measuring temperature of the heated skin material; and a solenoid valve opening at a preset speed to gradually suck internal air between the skin material and the base member if the measured temperature of the skin material reaches a preset value.

The horizontal molding apparatus may further include a timer for measuring a time for heating the skin material; and a solenoid valve opening at a preset speed to gradually suck internal air between the skin material and the base member if the measured time for heating the skin material reaches a preset value.

According to another aspect of the present invention, there is provided a horizontal molding method of an interior material of a vehicle, the horizontal molding method including (1) vertically attaching a skin material on a transfer unit; (2) moving the transfer unit, on which the skin material is attached, to a first mold disposed perpendicularly to a ground surface; (3) detaching the skin material from the transfer unit and vacuum-sucking and fixing the skin material onto the first mold; (4) sealing an internal space between the skin material and a base member formed on an inner circumferential surface of the first mold and having an embossed pattern; (5) sucking internal air between the skin material and the base member and vacuum-sucking the skin material onto the base member; (6) injecting a base material on a second mold; and (7) combining, pressing, and then cooling the first and second molds.

In step (1), the skin material may be preheated before being attached on the transfer unit.

The horizontal molding method may further include (4-1) heating the skin material by using a heating unit comprised in the transfer unit.

The horizontal molding method may further include (4-2) measuring temperature of the heated skin material by using a temperature sensor; and (4-3) opening a solenoid valve at a preset speed to gradually suck the internal air between the skin material and the base member if the measured temperature of the skin material reaches a preset value.

The horizontal molding method may further include (4-4) measuring a time for heating the skin material by using a timer; and (4-5) opening a solenoid valve at a preset speed to gradually suck the internal air between the skin material and the base member if the measured time for heating the skin material reaches a preset value.

Step (4) may include vertically moving clamps by using vertical cylinders and supporting edges of the skin material; and sealing the internal space between the skin material and the base member by horizontally moving the vertical cylinders into the first mold by using horizontal cylinders.

First embossed pattern printing may be performed on the skin material by combining the first and second molds after the skin material is vacuum-sucked onto the base member in step (5), and second embossed pattern printing may be performed on the skin material by performing step (7).

The base material may be injected on the second mold in step (6) after the combined first and second molds are completely separated by a predetermined distance.

The base material may be injected on the second mold in step (6) while the combined first and second molds are being separated by a predetermined distance.

In step (5), the internal air between the skin material and the base member may be vacuum-sucked through vacuum holes penetrating the base member, and each of the vacuum holes may be formed in a double structure comprising a large diameter hole for performing vacuum-suction, and a small diameter hole extended from the large diameter hole and connected to the internal space between the skin material and the base member.

The horizontal molding method may further include (8) reducing pressure between the first and second molds in order to improve a restoration rate of the skin material and separating the first and second molds.

The horizontal molding method may further include (4-6) expanding the skin material by injecting air into the internal space between the skin material and the base member; and (4-7) starting to perform vacuum-suction if the expanded skin material is supported by the second mold, and circulating the internal air between the skin material and the base member, and the air may be ionized before being injected into the internal space between the skin material and the base member.

Advantageous Effects

According to the present invention, a skin material and a base material may be integrally molded by using horizontally moving molds, the skin material expanded in a preheating or heating process may be prevented from sagging downward due to its weight, and the skin material may be completely sealed so as not to be folded or wrinkled.

Also, as double embossed pattern printing is performed on the skin material, an embossed pattern may be printed on a surface of the skin material more clearly.

Furthermore, as air is injected into a space for sealing the skin material to expand the skin material, the skin material may not be folded or wrinkled. If the air is ionized before being injected, the skin material may be cleaned.

In addition, as each of vacuum holes for performing vacuum-suction is formed in a double structure, vacuum-suction may be performed more appropriately and hole marks may not be left on a surface of the skin material.

BRIEF DESCRIPTION OF THE DRAWINGS

The above and other features and advantages of the present invention will become more apparent by describing in detail exemplary embodiments thereof with reference to the attached drawings in which.

MODE FOR THE INVENTION

Hereinafter, the present invention will be described in detail by explaining embodiments of the invention with reference to the attached drawings.

Figure 1:
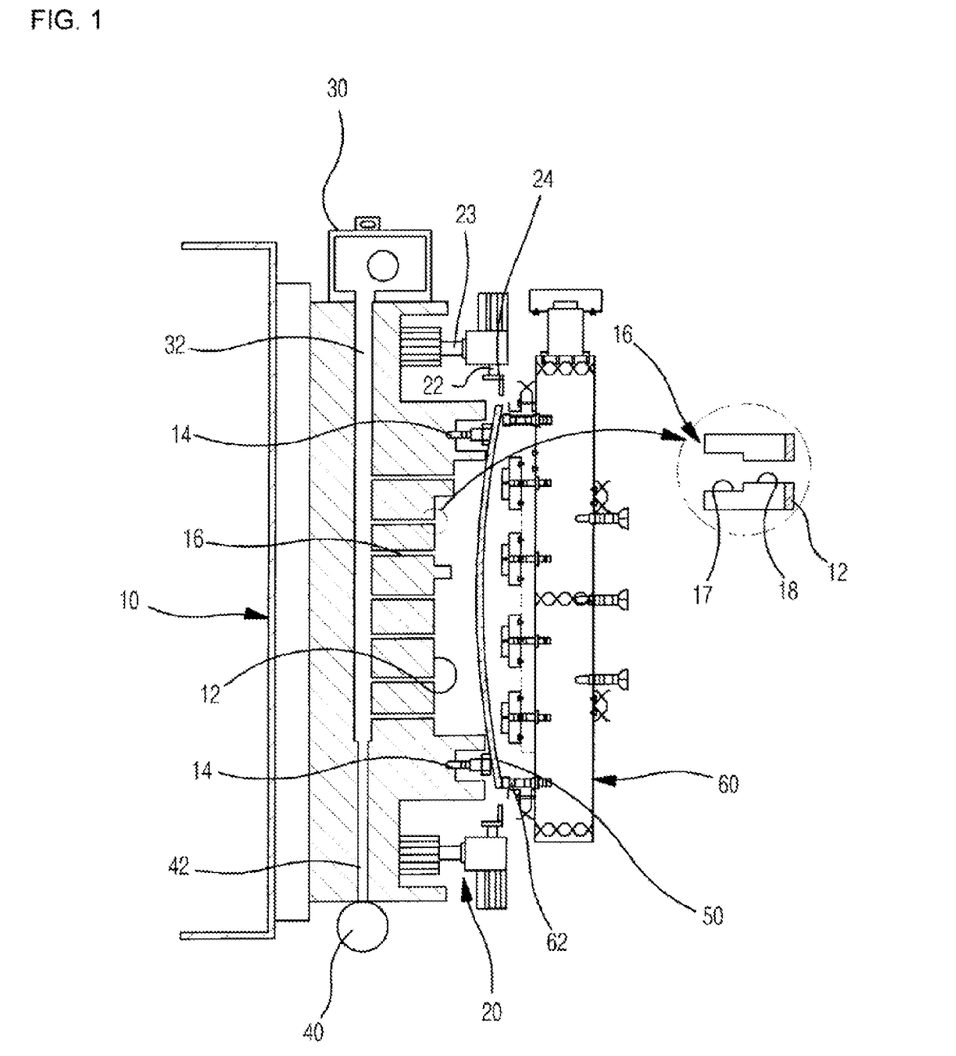
FIG. 1 is a cross-sectional view of a horizontal molding apparatus of an interior material of a vehicle, according to an embodiment of the present invention.
Figure 2:
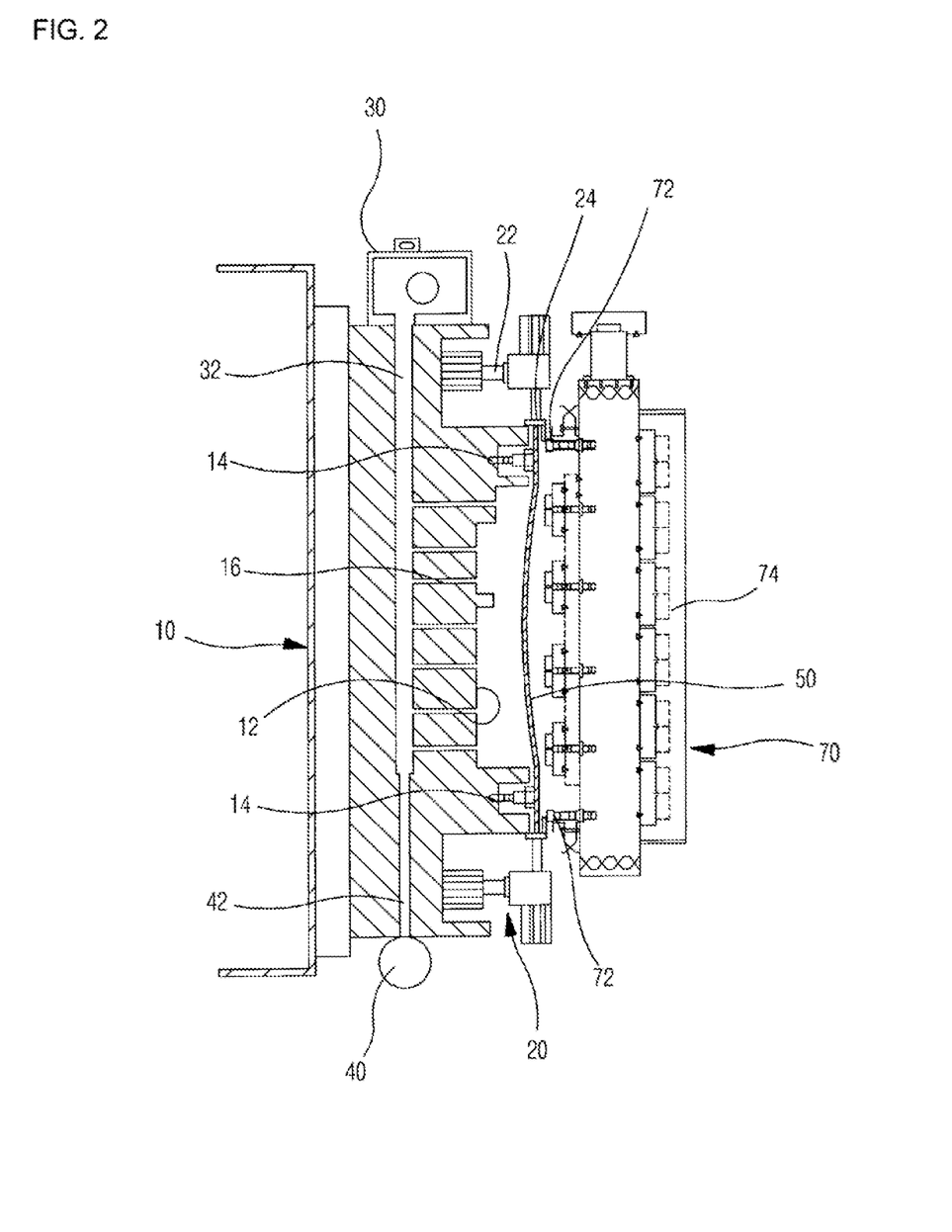
FIG. 2 is a cross-sectional view of a horizontal molding apparatus of an interior material of a vehicle, according to another embodiment of the present invention.
Figure 3:
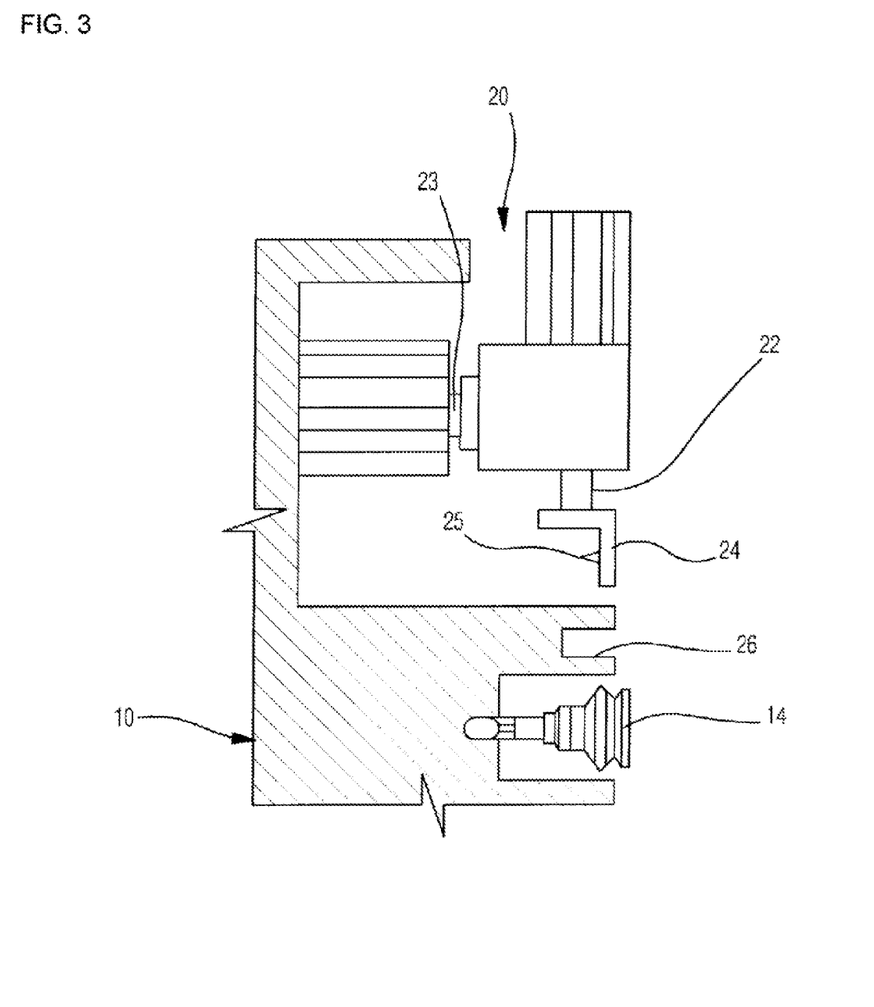
FIGS. 3 and 4 are cross-sectional views of exemplary cylinder structures in the horizontal molding apparatus illustrated in FIG. 1 or 2.
Figure 4:
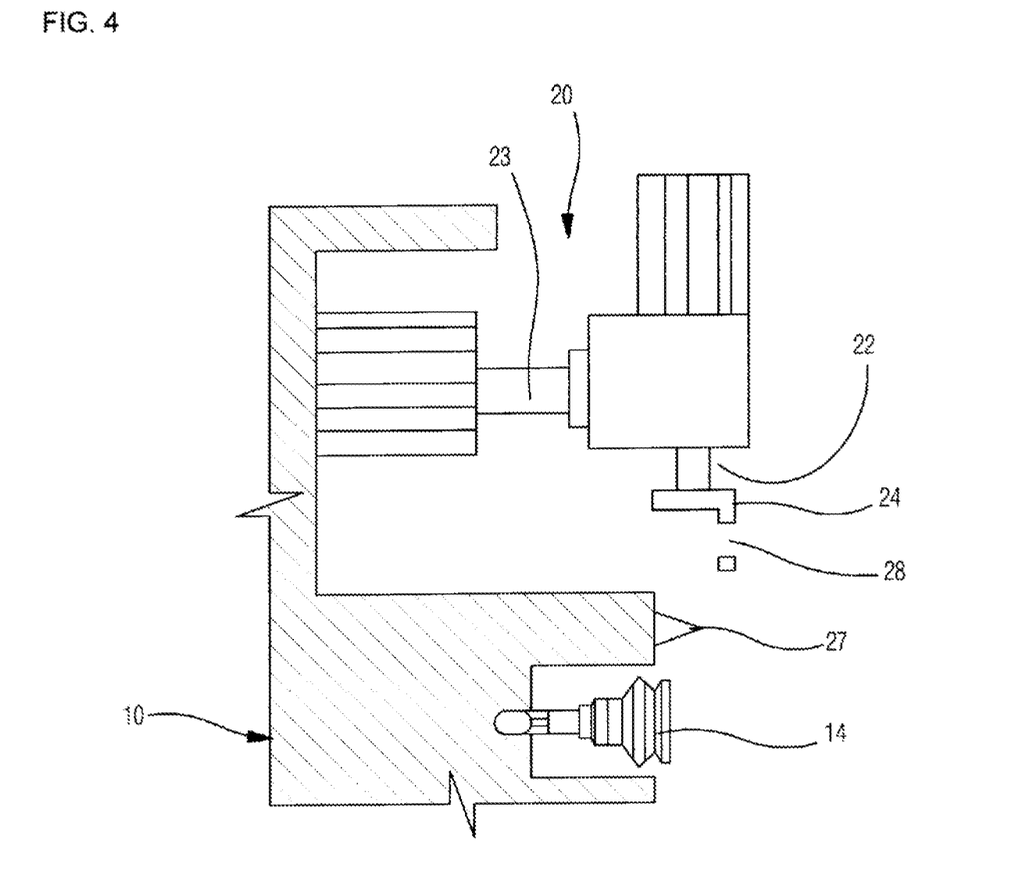

FIG. 1 is a cross-sectional view of a horizontal molding apparatus of an interior material of a vehicle, according to an embodiment of the present invention. FIG. 2 is a cross-sectional view of a horizontal molding apparatus of an interior material of a vehicle, according to another embodiment of the present invention. FIGS. 3 and 4 are cross-sectional views of exemplary cylinder structures in the horizontal molding apparatus illustrated in FIG. 1 or 2.

Initially, the horizontal molding apparatus illustrated in FIG. 1 will now be described.

Referring to FIG. 1, the horizontal molding apparatus illustrated in FIG. 1 includes a preheating means (not shown) for heating a skin material 50, a transfer unit 60 that moves while the preheated skin material 50 is vertically attached on or detached from the transfer unit 60, so as to transfer the skin material 50, a first mold 10 for clamping the skin material 50 transferred by the transfer unit 60, a second mold (not shown) disposed in parallel with the first mold 10 and on which a base material is injected, and a mold moving means (not shown) for horizontally moving one of the first mold 10 and the second mold to combine or separate them with or from each other.

Here, except that disposition and moving directions are horizontal, the second mold and the mold moving means are the same as those in a general molding apparatus of an interior material of a vehicle and thus the structure of the first mold 10 will be mainly described.

Also, the preheating means is a typical preheating device used to mold an interior material of a vehicle and thus will not be described in detail here.

The transfer unit 60 includes fixing units 62 for vertically attaching or detaching the preheated skin material 50 on or from the transfer unit 60. The fixing units 62 of the transfer unit 60 may attach or detach the skin material 50 by vacuum-sucking edges of the skin material 50. Also, the transfer unit 60 is formed to be movable to the first mold 10 while the preheated skin material 50 is attached on the fixing units 62. For example, the transfer unit 60 may be formed in a robot jig structure as illustrated in FIG. 1 or 2.

The first mold 10 is disposed perpendicularly to a ground surface so as to vertically receive the skin material 50 from the transfer unit 60, and the second mold on which the base material is injected is also disposed perpendicularly to the ground surface so as to be combined with the first mold 10. The mold moving means horizontally moves one of the first mold 10 and the second mold to combine or separate them with or from each other.

The first mold 10 includes suction units 14 for vacuum-sucking and fixing the edges of the skin material 50 transferred by the transfer unit 60, fixing members 20 for clamping and sealing the edges of the skin material 50, a base member 12 having an embossed pattern to be printed on the skin material 50, and vacuum holes 16 for vacuum-sucking the skin material 50 onto the base member 12.

The suction units 14 are disposed near end portions of the first mold 10 to correspond to the fixing units 62 of the transfer unit 60, and are elements for vacuum-sucking and temporarily fixing the edges of the skin material 50 onto the first mold 10.

Accordingly, while surface portions of the edges of the skin material 50 are vacuum-sucked and vertically fixed onto the fixing units 62 of the transfer unit 60, the transfer unit 60 moves to the first mold 10 and the other surface portions of the edges of the skin material 50 contact the suction units 14 of the first mold 10. In this case, the fixing units 62 of the transfer unit 60 may stop sucking the skin material 50 while the suction units 14 of the first mold 10 may start to vacuum-suck the skin material 50. As such, the skin material 50 may be transferred from the transfer unit 60 to the first mold 10.

The base member 12 having the embossed pattern to be printed on the skin material 50 is formed on an inner circumferential surface of the first mold 10. The embossed pattern to be printed on the skin material 50 is formed on the base member 12 by, for example, etching or laser processing the inner circumferential surface of the first mold 10.

Meanwhile, the suction units 14 are elements for vacuum-sucking and receiving the skin material 50 from the transfer unit 60, and do not provide a sufficient force to seal an internal space between the skin material 50 and the base member 12. Thus, the skin material 50 temporarily fixed by the suction units 14 may be clamped and completely fixed onto the first mold 10 by the fixing members 20 in a sealed state.

The fixing members 20 are elements for clamping the edges of the skin material 50 and sealing the internal space between the skin material 50 and the base member 12, and include clamps 24 for supporting the edges of the skin material 50, vertical cylinders 22 for vertically moving the clamps 24, and horizontal cylinders 23 for horizontally moving the vertical cylinders 22.

Accordingly, the clamps 24 support the edges of the skin material 50 fixed by the suction units 14 of the first mold 10, the vertical cylinders 22 vertically move the clamps 24, and the horizontal cylinders 23 horizontally move the vertical cylinders 22 into the first mold 10, thereby clamping the edges of the skin material 50 and completely sealing the internal space between the skin material 50 and the base member 12.

Meanwhile, if the skin material 50 is vacuum-sucked to print the embossed pattern while being clamped by the fixing members 20, the edges of the skin material 50 clamped by the fixing members 20 may possibly sucked into the first mold 10 due to the vacuum-suction process. In order to prevent this problem, support pins and pinholes for fixing the edges of the skin material 50 onto the first mold 10 may be additionally formed and used in the vacuum-suction process.

For example, as illustrated in FIG. 3, support pins 25 for supporting the edges of the skin material 50 may protrude from the clamps 24 and pinholes 26 into which the support pins 25 are inserted may be formed in the end portions of the first mold 10. Alternatively, as illustrated in FIG. 4, support pins 27 for supporting the edges of the skin material 50 may protrude from the end portions of the first mold 10, and pinholes 28 into which the support pins 27 are inserted may be formed in the clamps 24.

Also, the horizontal molding apparatus illustrated in FIG. 1 may further include the vacuum holes 16 penetrating through the base member 12 and for vacuum-sucking internal air between the skin material 50 and the base member 12.

In this case, each of the vacuum holes 16 is formed in a double structure including a large diameter hole 17 for performing vacuum-suction, and a small diameter hole 18 extended from the large diameter hole 17 and connected to the internal space between the skin material 50 and the base member 12.

That is, the large diameter hole 17 may have a relatively large diameter, e.g., a diameter equal to or greater than 10 mm, so as to appropriately vacuum-suck the internal air between the skin material 50 and the base member 12, and the small diameter hole 18 extended from the large diameter hole 17 may have a relatively small diameter, e.g., a diameter equal to or less than 0.2 mm, so as not to leave unnecessary marks on the skin material 50 in the vacuum-suction process.

Also, an air nozzle 42 for injecting air into the internal space between the skin material 50 and the base member 12 to expand the skin material 50 is formed at one of the end portions of the first mold 10 and is connected to an air supply means 40 for supplying the air. Thus, the air supplied by the air supply means 40 is injected into the internal space between the skin material 50 and the base member 12 through the air nozzle 42.

For example, as illustrated in FIG. 1, the air nozzle 42 may be connected to each of the vacuum holes 16, and the air supplied by the air supply means 40 may be injected into the first mold 10 through the air nozzle 42, and then may be injected into the internal space between the skin material 50 and the base member 12 through the vacuum holes 16.

As the skin material 50 clamped and sealed onto the first mold 10 is sufficiently expanded by the air injected through the air nozzle 42, the skin material 50 (in particular, the clamped edges of the skin material 50) may be prevented from being whitened or torn due to excessive elongation in the molding process.

Meanwhile, if the skin material 50 is sufficiently expanded by injecting the air through the air nozzle 42 and thus the expanded skin material 50 contacts and is supported by the second mold, air injection into and vacuum-suction of the internal space between the skin material 50 and the base member 12 may be performed simultaneously.

As air injection through the air nozzle 42 and vacuum-suction through the vacuum holes 16 are performed simultaneously, the internal air between the skin material 50 and the base member 12 may be continuously circulated and thus surfaces of the skin material 50 and the base member 12 may be cleaned.

For example, after the air supplied by the air supply means 40 is injected into the first mold 10 through the air nozzle 42, some of the air may be injected into the internal space between the skin material 50 and the base member 12 through the vacuum holes 16 while the other of the air may be vacuum-sucked through the vacuum holes 16.

Also, in order to enhance the cleaning effect by the air injected though the air nozzle 42, the horizontal molding apparatus illustrated in FIG. 1 may further include an ionizing member (not shown) for ionizing the air injected into the internal space between the skin material 50 and the base member 12 through the air nozzle 42. As the air supplied by the air supply means 40 is ionized by the ionizing member and then is injected into the internal space between the skin material 50 and the base member 12 through the air nozzle 42, the cleaning effect on the surfaces of the skin material 50 and the base member 12 may be enhanced.

Meanwhile, the skin material 50 generally used in an integral molding process may be formed in a double structure including a relatively thin skin layer having an embossed pattern, and a relatively thick foam layer for supporting the skin layer and providing a cushioning effect, or in a single structure including only a thin skin layer without a foam layer.

If the skin material 50 includes a skin layer and a foam layer to have a large thickness, even when the skin material 50 is preheated and then vertically fixed onto the first mold 10 as described above, it may not be folded or wrinkled. However, if the skin material 50 includes only a skin layer to have a small thickness, when the skin material 50 is preheated and then vertically fixed onto the first mold 10 as described above, it may not be folded or wrinkled, it may be folded or wrinkled as the skin material 50 expanded in the preheating process sags downward.

In a vertical molding apparatus that is typically used, the skin material 50 is horizontally provided and fixed and thus the above problem does not occur. However, in the horizontal molding apparatus illustrated in FIG. 1, the skin material 50 is vertically provided and fixed and thus the above problem significantly matters.

Another horizontal molding apparatus of an interior material of a vehicle, capable of solving the above problem, will now be described with reference to FIG. 2.

The horizontal molding apparatus illustrated in FIG. 2 may further include a heating unit 74 for heating the skin material 50, on a surface of a transfer unit 70 opposite to a surface of the transfer unit 70 on which fixing units 72 for attaching the skin material 50 on the transfer unit 70 are formed, such that the non-preheated skin material 50 may be fixed onto the first mold 10 and then be heated by the heating unit 74.

That is, the skin material 50 may be preheated by the additional preheating means before being fixed onto the transfer unit 60 as illustrated in FIG. 1, or may be heated by the heating unit 74 of the transfer unit 70 after being transferred to the first mold 10 by the transfer unit 70 as illustrated in FIG. 2. For this, the transfer unit 70 may further include the heating unit 74 for heating the skin material 50 in addition to the fixing units 72 for vertically attaching or detaching the skin material 50 on or from the transfer unit 70.

The horizontal molding apparatus illustrated in FIG. 1 may be used if the skin material 50 includes a skin layer and a foam layer to have a large thickness, and the horizontal molding apparatus illustrated in FIG. 2 may be used if the skin material 50 includes only a skin layer to have a small thickness.

Except that the transfer unit 70 includes the heating unit 74 instead of additionally including the preheating means for preheating the skin material 50, the horizontal molding apparatus illustrated in FIG. 2 is the same as the horizontal molding apparatus illustrated in FIG. 1.

Accordingly, the non-preheated skin material 50 is vacuum-sucked and attached onto the transfer unit 70 by the fixing units 72, is moved by the transfer unit 70, and then is vacuum-sucked onto the suction units 14 of the first mold 10. After that, the skin material 50 is clamped and sealed onto the first mold 10 by the fixing members 20 and then is heated by the heating unit 74 of the transfer unit 70.

In this case, if the skin material 50 to be heated by the heating unit 74 of the transfer unit 70 includes only a skin layer to have a small thickness, the skin material 50 expanded in the heating process may sag downward due to its weight.

In order to solve this problem, the horizontal molding apparatus illustrated in FIG. 2 may further include a temperature sensor (not shown) for measuring the temperature of the heated skin material 50 and, if the measured temperature of the skin material 50 reaches a preset value, a solenoid valve (not shown) for sucking the internal air between the skin material 50 and the base member 12 at a preset speed.

The temperature sensor is an element for measuring the temperature of the skin material 50 when the skin material 50 is heated by the heating unit 74 of the transfer unit 70, e.g., a non-contact infrared temperature sensor. The solenoid valve is an element that opens at the preset speed to gradually suck the internal air between the skin material 50 and the base member 12 if the temperature of the skin material 50 measured by the temperature sensor reaches the preset value, thereby preventing the skin material 50 from rapidly sagging downward.

Accordingly, if the temperature measured by the temperature sensor reaches a threshold temperature at which the skin material 50 is rapidly expanded, the solenoid valve starts to vacuum-suck the internal air between the skin material 50 and the base member 12. In this case, if the solenoid valve instantly and completely opens to perform vacuum-suction, the skin material 50 may be completely vacuum-sucked onto the base member 12 while the skin material 50 is not sufficiently heated. Thus, in order to prevent this problem, the solenoid valve may gradually open at the preset speed to perform vacuum-suction according to a degree that the skin material 50 sags, thereby preventing the skin material 50 from sagging due to its weight in the heating process.

Also, the horizontal molding apparatus illustrated in FIG. 2 may include, instead of the temperature sensor, a timer (not shown) for measuring a time for heating the skin material 50 and, if the time for heating the skin material 50 reaches a preset value, the solenoid valve sucks the internal air between the skin material 50 and the base member 12 at the preset speed.

That is, the degree that the skin material 50 sags may be previously calculated according to the time for heating the skin material 50, the timer may measure the time, and the solenoid valve may gradually open at the preset speed to perform vacuum-suction.

A horizontal molding method of an interior material of a vehicle by using the horizontal molding apparatus illustrated FIG. 1 or 2 will now be described with reference to FIGS. 5 through 7.

Figure 5:
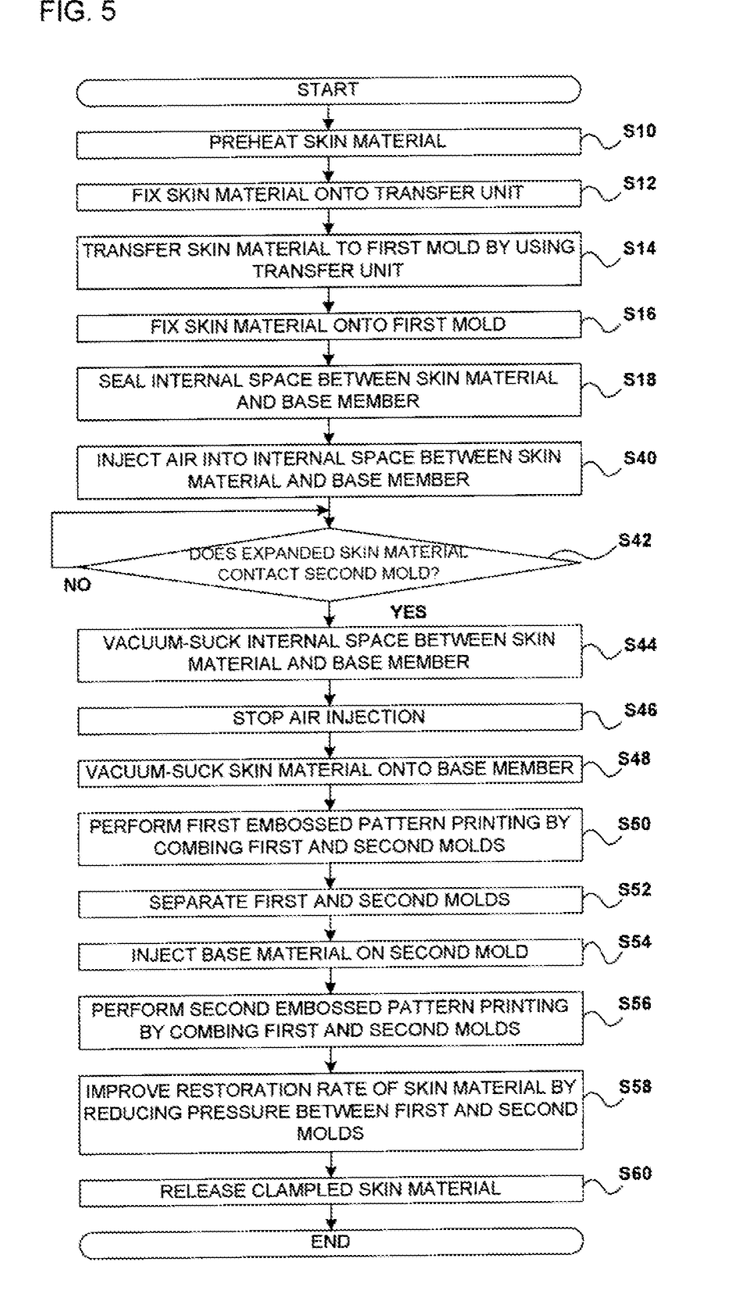
FIG. 5 is a flowchart of and FIG. 6 is a process chart of a horizontal molding method of an interior material of a vehicle, according to an embodiment of the present invention.
Figure 6:
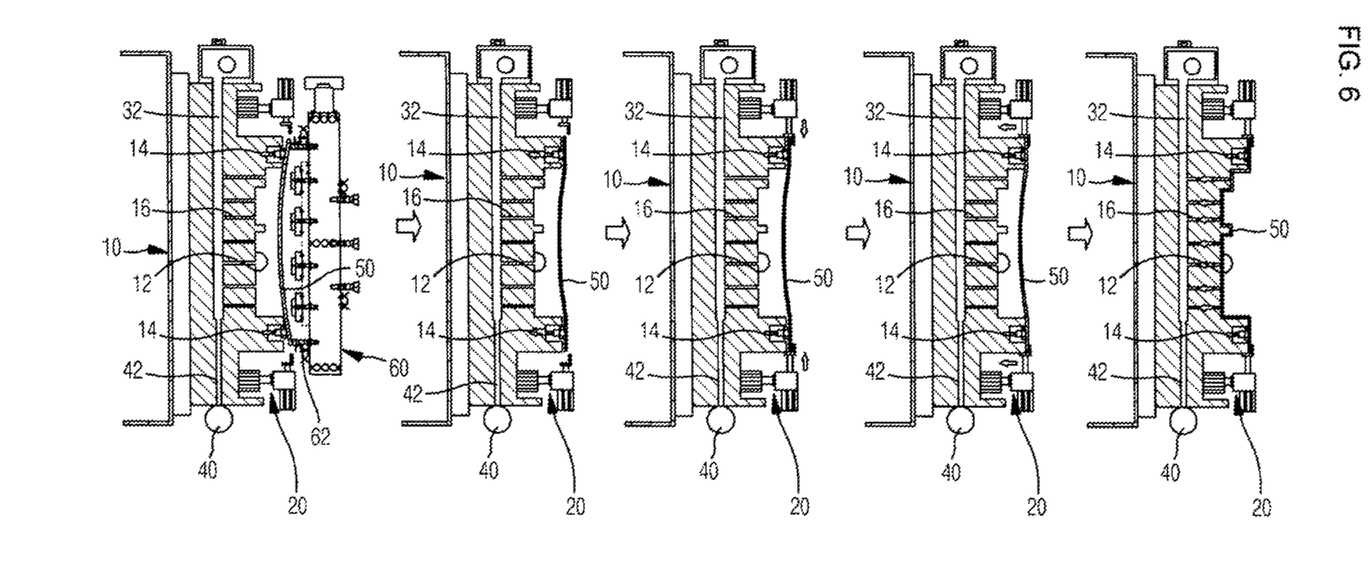

FIG. 5 is a flowchart of and FIG. 6 is a process chart of a horizontal molding method of an interior material of a vehicle, according to an embodiment of the present invention. FIG. 7 is a flowchart of a horizontal molding method of an interior material of a vehicle, according to another embodiment of the present invention.

Figure 7:
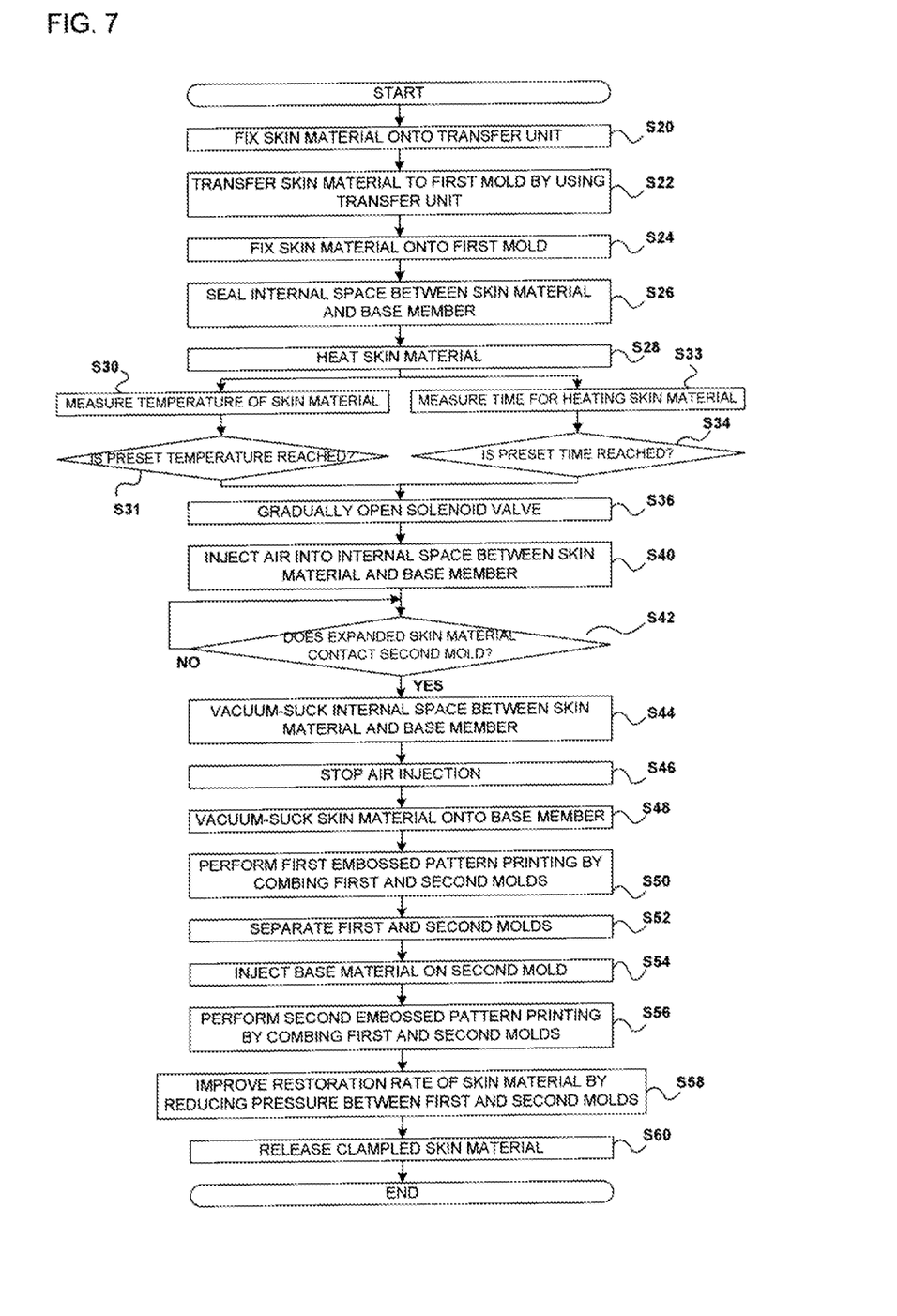
FIG. 7 is a flowchart of a horizontal molding method of an interior material of a vehicle, according to another embodiment of the present invention.

FIGS. 5 through 7 will be described in conjunction with FIG. 1 through FIG. 4.

Initially, the horizontal molding method illustrated in FIGS. 5 and 6 will now be described. The horizontal molding method illustrated in FIGS. 5 and 6 uses the horizontal molding apparatus illustrated in FIG. 1.

Referring to FIGS. 5 and 6, initially, the skin material 50 is preheated by using the additional preheating means (operation S10) and the preheated skin material 50 is vertically fixed onto the transfer unit 60 (operation S12). For this, the transfer unit 60 includes the fixing units 62 for vertically attaching or detaching the preheated skin material 50 on or from the transfer unit 60. The fixing units 62 of the transfer unit 60 may attach or detach the skin material 50 by vacuum-sucking edges of the skin material 50.

The transfer unit 60 moves to the first mold 10 while the skin material 50 is attached on the fixing units 62, and transfers the skin material 50 to the first mold 10 (operation S14). For this, the first mold 10 is disposed perpendicularly to a ground surface so as to vertically receive the skin material 50 from the transfer unit 60. The second mold on which a base material is injected is also disposed perpendicularly to the ground surface so as to be combined with the first mold 10, and the mold moving means horizontally moves one of the first mold 10 and the second mold to combine or separate them with or from each other.

Accordingly, while surface portions of the edges of the skin material 50 are vacuum-sucked and vertically fixed onto the fixing units 62 of the transfer unit 60, the transfer unit 60 moves to the first mold 10 and the other surface portions of the edges of the skin material 50 contact the suction units 14 of the first mold 10. In this case, the fixing units 62 of the transfer unit 60 may stop sucking the skin material 50 while the suction units 14 of the first mold 10 may start to vacuum-suck the skin material 50. As such, the skin material 50 transferred by the transfer unit 60 may be temporarily fixed onto the first mold 10 (operation S16).

The edges of the skin material 50 temporarily fixed by the suction units 14 of the first mold 10 are clamped onto the first mold 10 and thus an internal space between the skin material 50 and the base member 12 is sealed (operation S18).

In more detail, the vertical cylinders 22 vertically move the clamps 24 and thus the clamps 24 support the edges of the skin material 50. In this case, the horizontal cylinders 23 horizontally move the vertical cylinders 22 into the first mold 10, thereby completely sealing the internal space between the skin material 50 and the base member 12.

Meanwhile, after the internal space between the skin material 50 and the base member 12 is sealed by the fixing members 20, the skin material 50 may be expanded by injecting air into the internal space between the skin material 50 and the base member 12 (operation S40).

As the skin material 50 clamped and sealed onto the first mold 10 is sufficiently expanded by the injected air, the skin material 50 (in particular, the clamped edges of the skin material 50) may be prevented from being whitened or torn due to excessive elongation in the molding process.

If the skin material 50 is sufficiently expanded by injecting the air (operation S42) and thus the expanded skin material 50 contacts and is supported by the second mold, air injection into and vacuum-suction of the internal space between the skin material 50 and the base member 12 may be performed simultaneously (operation S44).

As air injection into the internal space between the skin material 50 and the base member 12 and vacuum-suction through the vacuum holes 16 penetrating through the base member 12 are performed simultaneously, the internal air between the skin material 50 and the base member 12 may be continuously circulated and thus surfaces of the skin material 50 and the base member 12 may be cleaned.

Also, in order to enhance the cleaning effect of the internal space between the skin material 50 and the base member 12, the air may be ionized before being injected into the internal space between the skin material 50 and the base member 12.

If the process of expanding the skin material 50 or the process of cleaning the internal space between the skin material 50 and the base member 12 is completed, air injection is stopped but vacuum-suction is continued (operation S46). Thus, if the internal air between the skin material 50 and the base member 12 is not circulated any more, and is vacuum-sucked and discharged to the outside of the first mold 10 through the vacuum holes 16, the skin material 50 is vacuum-sucked onto the base member 12 having an embossed pattern (operation S48).

Here, each of the vacuum holes 16 penetrating through the base member 12 to vacuum-suck the skin material 50 is formed in a double structure including the large diameter hole 17 for performing vacuum-suction, and the small diameter hole 18 extended from the large diameter hole 17 and connected to the internal space between the skin material 50 and the base member 12.

If the skin material 50 is vacuum-sucked onto a bottom surface of the base member 12, the first mold 10 and the second mold are combined and thus first embossed pattern printing is performed on the skin material 50 (operation S50).

Since embossed pattern printing may not be sufficiently performed by merely vacuum-sucking the skin material 50 onto the base member 12, the first mold 10 and the second mold may be combined to support the skin material 50 by the second mold while the skin material 50 is vacuum-sucked, and thus embossed pattern printing may be performed more sufficiently.

Meanwhile, since an empty space into which a base material is injected is formed between the first mold 10 and the second mold to have a predetermined thickness, the second mold may not contact and support one surface of the skin material 50 even when the first mold 10 and the second mold are combined with each other.

Typically, if the base material has a thickness of 2.5 t, the skin material 50 has a thickness of about 0.5 t and thus the space between the combined first mold 10 and the second mold has a thickness of totally 3 t. However, 0.5 t is a thickness when the skin material 50 is compressed in the molding process, and an initial thickness of the skin material 50 before being compressed is generally greater than 3 t in consideration of thicknesses of a skin layer and a foam layer.

Accordingly, even when the first mold 10 and the second mold are combined while only the skin material 50 is inserted without injecting the base material, the second mold may support one surface of the skin material 50 that is vacuum-sucked onto the first mold 10 and thus the first embossed pattern printing may be performed on the skin material 50 as described above.

After the first embossed pattern printing is performed by combining the first mold 10 and the second mold, the combined first mold 10 and the second mold are separated from each other (operation S52), and the base material is injected on the second mold by using an injection device (not shown) (operation S54). In this case, the first mold 10 and the second mold may be separated by a micro distance that is sufficient to inject the base material into the space between the first mold 10 and the second mold. The micro separation distance may be arbitrarily set according to the material and the thickness of the skin material 50, e.g., about 5 to 30 mm, in order to ensure the liquidity of the base material and to prevent the skin material 50 from being damaged due to injection of high-temperature and high-pressure resin.

The base material may be injected on the second mold after the combined first mold 10 and the second mold are completely separated by a predetermined distance, or while the combined first mold 10 and the second mold are being separated.

After that, the combined first mold 10 and the second mold are combined and pressed to perform second embossed pattern printing on the skin material 50 and then the base material is cooled (operation S56). Due to the double embossed pattern printing, embossed pattern printing may be performed on the skin material 50 more clearly and efficiently.

Then, the first mold 10 and the second mold may not be separated immediately after the second embossed pattern printing and the cooling of the base material are completed, and the pressure between the first mold 10 and the second mold may be reduced to improve a restoration rate of the skin material 50 (operation S58).

If the skin material 50 is formed in a double structure including a skin layer and a foam layer, the foam layer is formed of an elastic material for providing a cushioning effect and thus a restoration rate of the foam layer may deteriorate due to a high pressure in the molding process. If the restoration rate of the foam layer deteriorates, after the molding process is completed, the foam layer does not provide a cushioning effect and thus the quality of the molded interior material may deteriorate. Accordingly, in order to prevent this problem, the pressure reducing process may be performed after the interior material is completely molded and before the first mold 10 and the second mold are separated, and thus the restoration rate of the foam layer may be recovered.

After the above operations are completed, the skin material 50 clamped by the fixing members 20 is released and the first mold 10 and the second mold are separated to obtain the interior material (operation S60).

Then, the horizontal molding method illustrated in FIG. 7 will now be described. The horizontal molding method illustrated in FIG. 7 uses the horizontal molding apparatus illustrated in FIG. 2.

Referring to FIG. 7, except that the skin material 50 is transferred by the transfer unit 70 to the first mold 10 in a non-preheated state and then is heated by the heating unit 74 included in the transfer unit 70, the horizontal molding method illustrated in FIG. 7 is the same as the horizontal molding method illustrated in FIGS. 5 and 6.

Accordingly, the non-preheated skin material 50 is vacuum-sucked and fixed onto the transfer unit 70 (operation S20), the transfer unit 70 moves to the first mold 10 (operation S22), and the skin material 50 is vacuum-sucked onto the suction units 14 of the first mold 10 (operation S24). After that, the skin material 50 is clamped and sealed onto the first mold 10 by the fixing members 20 (operation S26) and then is heated by the heating unit 74 of the transfer unit 70 (operation S28).

In this case, if the skin material 50 to be heated by the heating unit 74 of the transfer unit 70 includes only a skin layer to have a small thickness, the skin material 50 expanded in the heating process may sag downward due to its weight.

In order to solve this problem, the temperature of the skin material 50 heated by the heating unit 74 of the transfer unit 70 is measured by using a temperature sensor (operation S30) and, if the measured temperature of the skin material 50 reaches a preset value (operation S31), a solenoid valve starts to vacuum-suck the internal air between the skin material 50 and the base member 12 at a preset speed (operation S36). In this case, the solenoid valve may gradually open at the preset speed to perform suction according to a degree that the skin material 50 sags, thereby preventing the skin material 50 from sagging due to its weight in the heating process.

Alternatively, a time for heating the skin material 50 by the heating unit 74 of the transfer unit 70 may be measured by using a timer (operation S33) and, if the time for heating the skin material 50 reaches a preset value (operation S34), the solenoid valve may gradually open at the preset speed to perform suction according to the degree that the skin material 50 sags (operation S36).

After the skin material 50 is completely sealed and pre-heated, an operation of expanding the skin material 50 by injecting air into the internal space between the skin material 50 and the base member 12 (operation S40), an operation of simultaneously performing air injection into and vacuum-suction of the internal space between the skin material 50 and the base member 12 to clean surfaces of the skin material 50 and the base member 12 if the expanded skin material 50 contacts and is supported by the second mold (operation S44), an operation of vacuum-sucking the skin material 50 onto the base member 12 having an embossed pattern (operation S48), and an operation of combining the first mold 10 and the second mold to perform first embossed pattern printing on the skin material 50 (operation S50) are performed as described above in relation to FIGS. 5 and 6.

After the first embossed pattern printing is performed, an operation of separating the combined first mold 10 and the second mold from each other and injecting the base material on the second mold (operation S54), an operation of performing second embossed pattern printing on the skin material 50 by combining and pressing the first mold 10 and the second mold, and then cooling the base material (operation S56), an operation of reducing the pressure between the first mold 10 and the second mold to improve a restoration rate of the skin material 50 (operation S58), and an operation of releasing the clamped skin material 50 and separating the first mold 10 and the second mold to obtain the interior material (operation S60) are performed as described above in relation to FIGS. 5 and 6.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A horizontal molding apparatus of an interior material of a vehicle, the horizontal molding apparatus comprising:
    a preheating means for preheating a skin material;
    a transfer unit formed to be movable and comprising fixing units for vertically attaching or detaching the preheated skin material on or from the transfer unit;
    a first mold disposed perpendicularly to a ground surface and comprising suction units for vacuum-sucking and fixing edges of the skin material transferred by the transfer unit, a base member having an embossed pattern to be printed on the skin material, fixing members for sealing an internal space between the skin material and the base member by clamping the edges of the skin material, and vacuum holes for vacuum-sucking the skin material onto the base member;
    a second mold disposed in parallel with the first mold and on which a base material is injected; and
    a mold moving means for horizontally moving one of the first and second molds and combining or separating the first and second molds to or from each other,
    wherein the fixing members comprise:
    clamps for supporting the edges of the skin material;
    vertical cylinders for vertically moving the clamps; and
    horizontal cylinders for horizontally moving the vertical cylinders.

2. The horizontal molding apparatus of claim 1, wherein the fixing units of the transfer unit attach or detach the skin material by vacuum-sucking the edges of the skin material.

3. The horizontal molding apparatus of claim 1, further comprising:
    support pins protruding from the clamps and for supporting the edges of the skin material; and
    pinholes formed in the first mold and into which the support pins are inserted.

4. The horizontal molding apparatus of claim 1, further comprising:
    support pins protruding from the first mold and for supporting the edges of the skin material; and
    pinholes formed in the clamps and into which the support pins are inserted.

5. The horizontal molding apparatus of claim 1, wherein each of the vacuum holes is formed in a double structure comprising a large diameter hole penetrating through the base member, and a small diameter hole extended from the large diameter hole and connected to the internal space between the skin material and the base member.

6. The horizontal molding apparatus of claim 1, further comprising an air nozzle for injecting air into the internal space between the skin material and the base member in order to expand the skin material.

7. The horizontal molding apparatus of claim 1, further comprising an ionizing member for ionizing air to be injected through an air nozzle into the internal space between the skin material and the base member.

8. A horizontal molding apparatus of an interior material of a vehicle, the horizontal molding apparatus comprising:
    a transfer unit formed to be movable and comprising fixing units for vertically attaching or detaching a skin material on or from the transfer unit, and a heating unit for heating the skin material;
    a first mold disposed perpendicularly to a ground surface and comprising suction units for vacuum-sucking and fixing edges of the skin material transferred by the transfer unit, a base member having an embossed pattern to be printed on the skin material, fixing members for sealing an internal space between the skin material and the base member by clamping the edges of the skin material, and vacuum holes for vacuum-sucking the skin material onto the base member;
    a second mold disposed in parallel with the first mold and on which a base material is injected; and
    a mold moving means for horizontally moving one of the first and second molds and combining or separating the first and second molds to or from each other,
    wherein the fixing members comprise:
    clamps for supporting the edges of the skin material;
    vertical cylinders for vertically moving the clamps; and
    horizontal cylinders tier horizontally moving the vertical cylinders.

9. The horizontal molding apparatus of claim 8, wherein the fixing units of the transfer unit attach or detach the skin material by vacuum-sucking the edges of the skin material.

10. The horizontal molding apparatus of claim 8, further comprising:
   support pins protruding from the clamps and for supporting the edges of the skin material; and
   pinholes formed in the first mold and into which the support pins are inserted.

11. The horizontal molding apparatus of claim 8, further comprising:
   support pins protruding from the first mold and for supporting the edges of the skin material; and
   pinholes formed in the clamps and into which the support pins are inserted.

12. The horizontal molding apparatus of claim 8, wherein each of the vacuum holes is formed in a double structure comprising a large diameter hole penetrating through the base member, and a small diameter hole extended from the large diameter hole and connected to the internal space between the skin material and the base member.

13. The horizontal molding apparatus of claim 8, further comprising an air nozzle for injecting air into the internal space between the skin material and the base member in order to expand the skin material.

14. The horizontal molding apparatus of claim 8, further comprising an ionizing member for ionizing air to be injected through an air nozzle into the internal space between the skin material and the base member.

15. The horizontal molding apparatus of claim 8, further comprising:
   a temperature sensor for measuring temperature of the heated skin material; and
   a solenoid valve opening at a preset speed to gradually suck internal air between the skin material and the base member if the measured temperature of the skin material reaches a preset value.

16. The horizontal molding apparatus of claim 8, further comprising:
   a timer for measuring a time for heating the skin material; and
   a solenoid valve opening at a preset speed to gradually suck internal air between the skin material and the base member if the measured time for heating the skin material reaches a preset value.

* * * * *